Sept. 15, 1964    V. C. J. PETERSON ETAL    3,148,863
CONDUIT AND CORE ELEMENT REELING DEVICE
Filed March 13, 1963
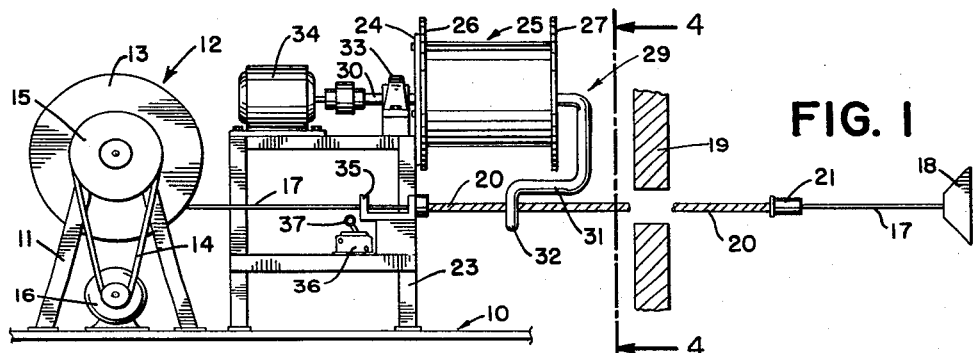
FIG. 1
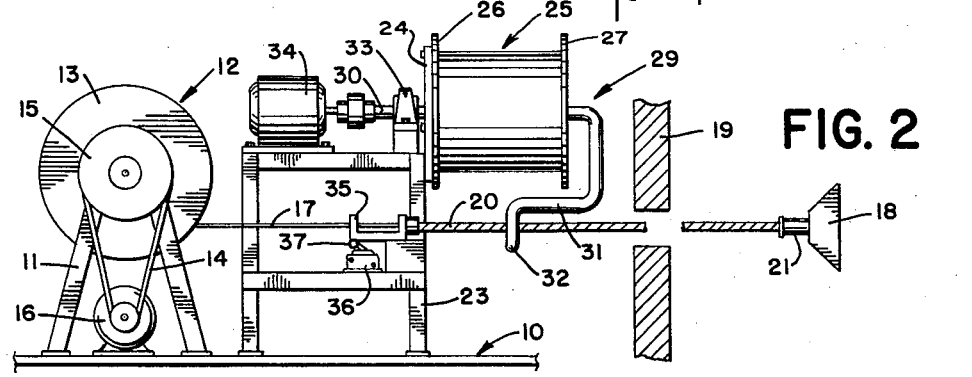
FIG. 2
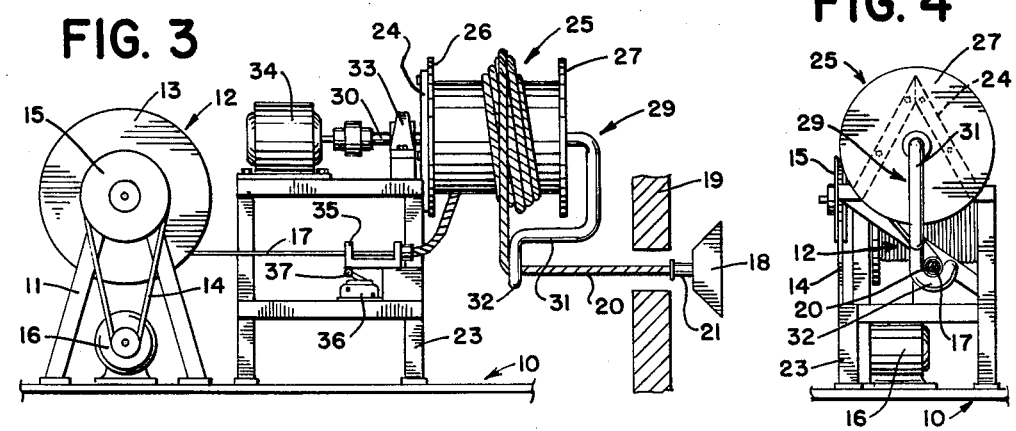
FIG. 3
FIG. 4
INVENTORS
HARRY WILLIAMS
VINCENT C. J. PETERSON
BY
ATTORNEYS United States Patent Office 3,148,863
Patented Sept. 15, 1964

3,148,863
CONDUIT AND CORE ELEMENT REELING
DEVICE
Vincent C. J. Peterson, Huntingdon Valley, Pa., and Harry
Williams, Birmingham, Mich., assignors to American
Chain & Cable Company, Inc., New York, N.Y., a
corporation of New York
Filed Mar. 13, 1963, Ser. No. 264,872
7 Claims. (Cl. 254—175.7)

This invention relates to reeling devices for separately winding a relatively short flexible conduit and a relatively long core element movable through said conduit. More particularly, it relates to a reeling device of that type wherein the core element is wound about a rotatable reel while the conduit along with that portion of the core element therewithin is separately wound about a fixed reel by means of a rotatable bail.

There are uses of a conduit and a core element longitudinally movable therewithin where the core element should advantageously be stored on one reel and the conduit on an entirely separate reel. For example, when a target is pulled along by a tow cable behind an aircraft, that portion of the tow cable adjacent the aircraft should be sheathed within a conduit to protect it from the heat of jet engine exhaust from the aircraft. Thus, the target is payed out on a tow cable which carries with it a protective conduit for the first one hundred feet or so behind the aircraft. Thereafter the tow cable continues to pay out to allow the target to be carried further away from the aircraft and the conduit remains in its protective position over that length of the tow cable adjacent the aircraft. When the target is to be wound in, the tow cable pulls it toward the aircraft until it contacts the outer end of the conduit and then both the conduit and portion of the tow cable therewithin are reeled into the aircraft together. Since the conduit should be attached at one end to the aircraft, it may not practically be wound and stored on the same reel which winds and stores the tow cable.

In accordance with the invention, a device is provided for separately winding and unwinding the relatively short flexible conduit and the relatively long tow cable or core element movable through the conduit. Broadly stated, the new reeling device comprises a frame and a driven axially rotatable reel on the frame to which a length of the core element removed from the conduit is directed substantially perpendicular to the axis of the rotatable reel to be wound thereabout. A stationary reel on the frame is disposed in substantially parallel relation with respect to part of the conduit. Driven bail means are rotatable on the frame about the axis of stationary reel and are engageable with the conduit to wind about the stationary reel at least part of the conduit and that portion of the core element therewithin. It is preferred that actuating means on the frame responds to the position of the core element within the conduit to effect the operation of one or the rotatable reel and bail means only when the other is not operating.

As a target is payed out behind an aircraft the bail means are driven to unwind a length of the conduit wrapped about the stationary reel until such time as all of the conduit is removed from that stationary reel. Rotation of the bail means is then stopped and the rotatable reel is driven to pay out the full desired length of tow cable or core element through the conduit. The conduit thus protects that initial portion of the core element extending behind the aircraft and prevents damage to it from the heat of jet exhaust from the aircraft. When the tow cable assembly is to be drawn back into the aircraft, the rotatable reel is driven until such time as the target or some associated part is brought into engagement with the outer end of the conduit. Operation of the rotatable reel is then stopped and the bail means is rotatable so as to draw the conduit into the aircraft and wind it about the stationary reel entirely separate from the rotatable reel.

A preferred embodiment of the invention is described hereinbelow with reference to the accompanying drawing, wherein FIG. 1 is an elevation of the new reeling device showing the conduit and core element fully extended and partly broken away;

FIG. 2 is a similar view showning an object at the end of the core element, which may be part of a target, drawn into contact with the outer end of the conduit;

FIG. 3 is a similar view after the conduit has been wrapped about the stationary reel by the bail means; and FIG. 4 is a section taken along the line 4—4 of FIG. 1.

The illustrated embodiment of the invention is somewhat simplified for purposes of clarity and is not necessarily representative of the compact form which might well be designed for actual use as a target tow line reeling device. A frame 10 includes a first standard 11 upon which is supported a rotatable reel 12 having end flanges 13, only one of which is visible in the drawing. By means of a belt 14 and pulley 15 driven by a first electric motor 16, the reel 12 may be rotated positively in either direction about its axis.

An extended tow cable or core element 17 which may be of stranded wire is directed substantially perpendicular to the axis of the rotatable reel 12 to be wound thereabout. The core element 17 is connected at its outer end to a displaceable object 18 which may be part of a target. That portion of the core element 17 nearest structure 19 of the aircraft is sheathed within a conduit 20 having an outer end fitting 21 through which the core element 17 is longitudinally movable.

Also included in the frame 10 is a second standard 23 which includes an upwardly extending supporting bracket 24. A stationary reel 25 is affixed at one of two end flanges 26 and 27 to the bracket 24 such that the axis of the stationary reel 25 is disposed perpendicular to the axis of the rotatable reel 12 and in substantially parallel spaced relation with part of the conduit 20. A rotatable bail 29 includes a first portion 30 extending axially through the stationary reel 25 and a second portion 31 projecting radially outwardly in spaced relation with respect to the flange 27 of the stationary reel remote from its affixed end. This second portion 31 of the bail 29 has an end hook 32 engageable with the conduit 20 as shown in FIG. 4. The first portion 30 of the bail 29 is mounted in suitable bearings 33 and is in driven connection with a second electric motor 34 adapted to rotate the bail in either direction about the axis of the stationary reel 25.

Secured to one end of the conduit 20 is an anchorage fitting 35 which is mounted for limited movement on the standard 23 of the frame 10 in any suitable manner and is located between the reels 12 and 25. A switch 36 is located on the standard 23 and has an arm 37 adapted to be tripped by the anchorage fitting 35 when the latter undergoes its limited movement on the frame.

The operation of this new reeling device can best be described by commencing with its condition wherein the object 18 is in the fully extended position behind the aircraft. Under those circumstances the conduit 20 is disposed about the first one-hundred feet or so of the core element 17 behind the aircraft to protect it from the heat of jet engine exhaust. Neither the motor 16 nor 34 is operating under these conditions and the conduit 20 rests in the hook 32 on the bail 29 as shown in FIG. 4.

When it is desired to retract the object 18 back into the aircraft, the operator activates the first electric motor 16 by any suitable hand switch (not shown). This causes the first reel 12 to rotate about its axis in a clockwise direction as seen in FIGS. 1 to 3 so as to wind the core element 17 between its flanges 13 in a conventional manner. If desired, indexing means may be provided to lay successive convolutions of the wound core element side-by-side in successive layers on the reel 12. As the core element 17 is drawn into the aircraft in this manner, the object 18 at its extreme outer end approaches the end fitting 21 of the conduit 20 which otherwise remains in its protective fully extended position immediately behind the aircraft.

As shown in FIG. 2, the object 18 eventually draws into engagement with the end fitting 21 on the conduit 20 and this in turn places the conduit 20 under compression. Such compressive loading of the conduit 20 transmits a force to the anchorage fitting 35 and causes it to undergo its limited sliding displacement to the left as seen in the drawing. As a result, the arm 37 of the switch 36 is contacted and tripped and by any suitable circuitry the first electric motor 16 is stopped and the second electric motor 34 is automatically started. Consequently, the reel 12 ceases rotation and the bail means 29 begins to rotate about the axis of the stationary reel 25 in a clockwise direction as seen in FIG. 4.

Upon rotation of the bail 29, its hook 32 on the second portion 31 pulls the conduit 20 laterally to one side. Since the anchorage fitting 35 cannot undergo unlimited displacement, the bail 29 begins to draw the conduit 20 up and around the stationary reel 25 and to pull the extended portion of the conduit into the aircraft. Successive loops of the conduit 20 and the portion of the core element 17 therewithin are thus wrapped about the stationary reel 25 between its end flanges 26 and 27 as shown in FIG. 3. The operator observes the progress of this winding operation about the stationary reel 35 until the object 18 at the end of the core element is brought to its desired position adjacent or even within the aircraft and he then stops the second electric motor 34 by some suitable hand switch (not shown).

In order to return to the fully extended position of the target drone shown in FIG. 1, the operator again actuates the second electric motor 34 to drive the bail 29 in a counterclockwise direction as seen in FIG. 4 so as to unwind the loops of the conduit 20 wrapped about the stationary reel 25. The weight and drag on the object 18 causes it to pull the conduit 20 and the portion of the core element 17 contained therewithin outwardly beyond the aircraft structure 19. As soon as the full length of the conduit 20 is removed from the stationary reel 25 by the bail 29, the core element 17 begins to slide through the conduit 20 and the friction between them places the conduit 20 under tension. As a result, the anchorage fitting 35 is moved to the right as seen in the drawing thereby releasing the switch arm 37 and stopping the second electric motor 34 so that the bail 29 is left in the position shown in FIG. 4. Also, the second electric motor 16 is actuated to drive the rotatable reel 12 in a counterclockwise direction as seen in FIGS. 1 to 3 so as positively to continue the paying out of the length of the core element 17 through the extended conduit 21.

Several variations may be made in the form of the new reeling device described above without departing from the scope of the invention. One of the more apparent modifications would be to provide a suitable auxiliary switch capable of stopping the second electric motor 34 at the end of the entire reeling operation when the conduit 20 is fully applied about the stationary reel 25 as shown in FIG. 3. Whether such evident modifications are made or not, the new reeling device affords means for winding and storing the core element 17 separately from the conduit 20. Consequently, the conduit 20 may be attached permanently to the frame 10 (by the anchorage fitting 35), which would not be possible if the entire conduit and core element were wound about a single reel. Also, damage is avoided to the core element 17 by the heavier and bulkier conduit 20 which otherwise might occur if both were drawn onto the same reel.

We claim:

1. A reeling device for separately winding a relatively short flexible conduit and a relatively long core element movable through said conduit comprising:
    (a) a frame;
    (b) a driven axially rotatable reel on said frame to which a length of said core element removed from said conduit is directed substantially perpendicular to the axis of said rotatable reel to be wound thereabout;
    (c) a stationary reel on said frame disposed in substantially parallel spaced relation with respect to part of said conduit; and
    (d) driven bail means rotatable on said frame about the axis of said stationary reel and engageable with said conduit to wind about said stationary reel at least part of said conduit and that portion of said core element therewithin.

2. A reeling device for separately winding a relatively short flexible conduit and a relatively long core element movable through said conduit comprising:
    (a) a frame;
    (b) a driven axially rotatable reel on said frame to which a length of said core element removed from said conduit is directed substantially perpendicular to the axis of said rotatable reel to be wound thereabout;
    (c) a stationary reel on said frame disposed in substantially parallel spaced relation with respect to part of said conduit;
    (d) driven bail means rotatable on said frame about the axis of said stationary reel and engageable with said conduit to wind about said stationary reel at least part of said conduit and that portion of said core element therewithin; and
    (e) actuating means on said frame responsive to the position of said core element within said conduit for effecting operation of one of said rotatable reel and bail means only when the other is not operating.

3. A reeling device for separately winding a relatively short flexible conduit and a relatively long core element movable through said conduit and connected at one end to a displaceable object comprising:
    (a) a frame;
    (b) a driven rotatable reel on said frame to which a length of said core element removed from said conduit is directed substantially perpendicular to the axis of said rotatable reel to be wound thereabout;
    (c) a stationary reel disposed in substantially parallel spaced relation with part of said conduit;
    (d) driven bail means rotatable on said frame about the axis of said stationary reel and engageable with said conduit to wind about said stationary reel at least part of said conduit and that portion of said core element therewithin;
    (e) an anchorage fitting secured to one end of said conduit and mounted for limited movement on said frame;
    (f) switch means on said frame in controlling relation with said rotatable reel and bail means and operable in response to movement of said anchorage fitting, whereby displacement of said object into contact with said conduit causes limited movement of said conduit and anchorage fitting which actuates said switch means to stop the operation of said rotatable reel and start the operation of said bail.

4. A reeling device for separately winding a relatively short flexible conduit and a relatively long core element movable through said conduit and connected at one end to a displaceable object comprising:
(a) a frame;
(b) a driven rotatable reel on said frame to which a length of said core element removed from said conduit is directed substantially perpendicular to the axis of said rotatable reel to be wound thereabout;
(c) a stationary reel affixed at one end to said frame and disposed in substantially parallel spaced relation with part of said conduit;
(d) driven bail means rotatable on said frame about the axis of said stationary reel and engageable with said conduit to wind about said stationary reel at least part of said conduit and that portion of said core element therewithin;
(e) an anchorage fitting secured to one end of said conduit and mounted for limited movement on said frame;
(f) switch means on said frame in controlling relation with said rotatable reel and bail means and operable in response to movement of said anchorage fitting, whereby displacement of said object into contact with said conduit causes limited movement of said conduit and anchorage fitting which actuates said switch means to stop the operation of said rotatable reel and start the operation of said bail.

5. A reeling device for separately winding a relatively short flexible conduit and a relatively long core element movable through said conduit and connected at one end to a displaceable object comprising:
(a) a frame;
(b) an axially rotatable reel on said frame to which a length of said core element removed from said conduit is directed substantially perpendicular to the axis of said rotatable reel to be wound thereabout;
(c) a stationary reel affixed at one end to said frame and disposed in substantially parallel spaced relation with part of said conduit;
(d) a rotatable bail having a first portion extending axially through said stationary reel and a second portion projecting radially outwardly in spaced relation with respect to that end of the stationary reel remote from its affixed end, said second portion having an end engageable with said conduit;
(e) motor means for separately driving said rotatable reel and bail;
(f) an anchorage fitting secured to one end of said conduit and mounted for limited movement on said frame;
(g) switch means on said frame in controlling relation with said motor means and operable in response to movement of said anchorage fitting, whereby displacement of said object into contact with said conduit causes limited movement of said conduit and anchorage fitting which actuates said switch means to stop the operation of said rotatable reel and start the operation of said bail.

6. A reeling device for separately winding a relatively short flexible conduit and a relatively long core element movable through said conduit and connected at one end to a displaceable object comprising:
(a) a frame;
(b) an axially rotatable reel on said frame to which a length of said core element removed from said conduit is directed substantially perpendicular to the axis of said rotatable reel to be wound thereabout;
(c) a first electric motor for driving said rotatable reel;
(d) a stationary reel affixed at one end to said frame and disposed in substantially parallel spaced relation with part of said conduit;
(e) a rotatable bail having a first portion extending axially through said stationary reel and a second portion projecting radially outwardly in spaced relation with respect to that end of the stationary reel remote from its affixed end, said second portion having an end engageable with said conduit;
(f) a second electric motor for rotating said bail about the axis of said stationary reel;
(g) an anchorage fitting secured to one end of said conduit and mounted between said reels for limited movement on said frame;
(h) switch means on said frame in controlling relation with said first and second electric motors and operable in response to movement of said anchorage fitting, whereby displacement of said object into contact with said conduit causes limited movement of said conduit and anchorage fitting which actuates said switch means to stop the operation of said rotatable reel and start the operation of said bail.

7. A reeling device for separately winding a relatively short flexible conduit and a relatively long core element movable through said conduit and connected at one end to a displaceable object comprising:
(a) a frame;
(b) an axially rotatable flanged reel on said frame to which a length of said core element removed from said conduit is directed substantially perpendicular to the axis of said rotatable reel to be wound thereabout;
(c) a first electric motor for driving said rotatable reel;
(d) a stationary flanged reel affixed at one end to said frame and axially disposed perpendicular to the axis of said rotatable reel in substantially parallel spaced relation with part of said conduit;
(e) a rotatable bail having a first portion extending axially through said stationary reel and a second portion projecting radially outwardly in spaced relation with respect to that end of the stationary reel remote from its affixed end, said second portion having an end engageable with said conduit;
(f) a second electric motor for rotating said bail about the axis of said stationary reel;
(g) an anchorage fitting secured to one end of said conduit and mounted between said reels for limited movement on said frame;
(h) switch means on said frame in controlling relation with said first and second electric motors and operable in response to movement of said anchorage fitting, whereby displacement of said object into contact with said conduit causes limited movement of said conduit and anchorage fitting which actuates said switch means to stop operation of said rotatable reel and start operation of said bail.

References Cited in the file of this patent
UNITED STATES PATENTS

| | | |
|---|---|---|
| 2,849,194 | Henning | Aug. 26, 1958 |
| 2,862,673 | Smaltz | Dec. 2, 1958 |